United States Patent Office 3,505,531
Patented Apr. 7, 1970

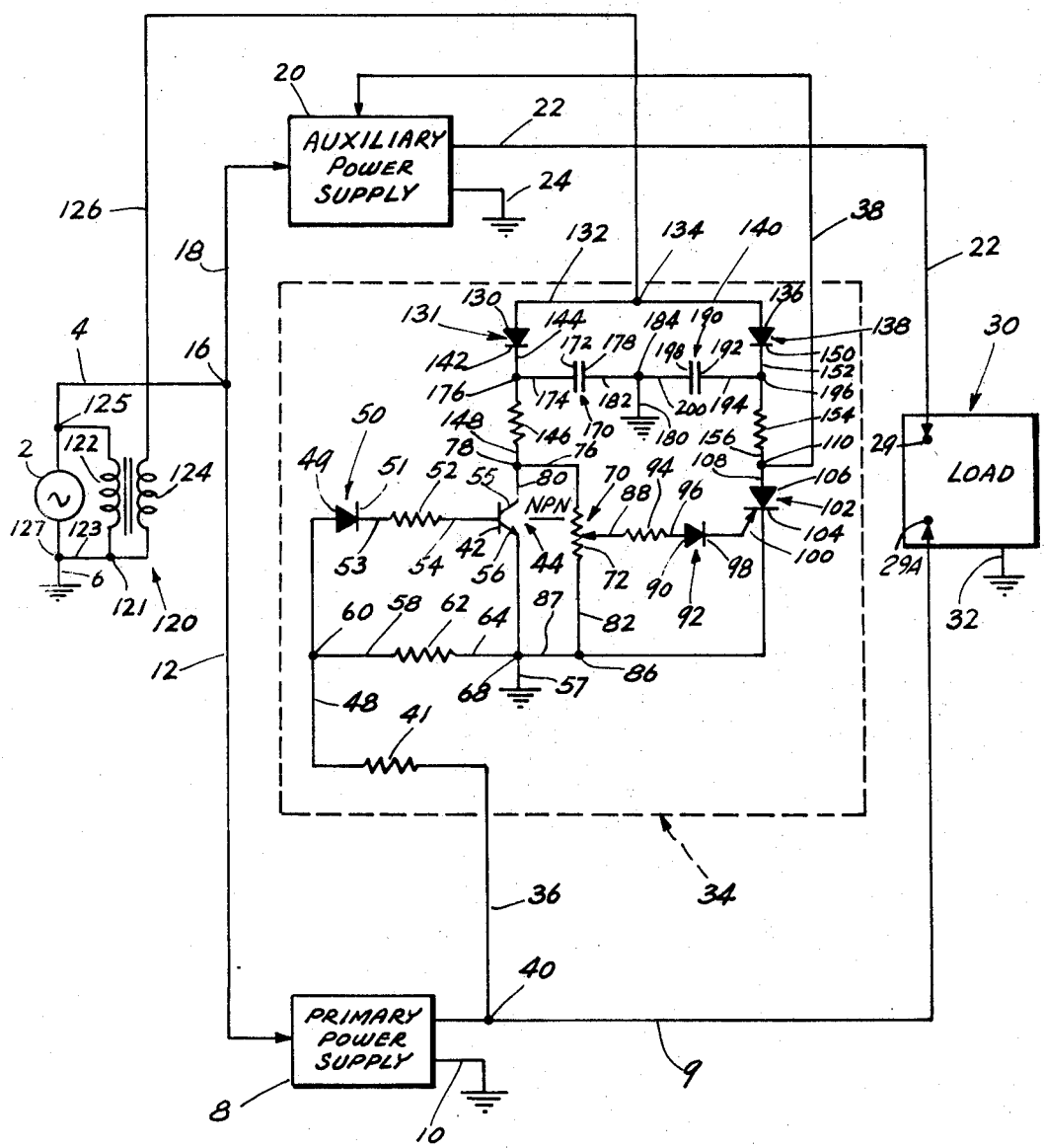

3,505,531
CONTROL CIRCUIT FOR ELECTRICAL SYSTEMS
HAVING REDUNDANT POWER SUPPLIES
Harry B. Wattson, Rutherford, N.J., assignor to The
Bendix Corporation, a corporation of Delaware
Filed Nov. 15, 1966, Ser. No. 594,594
Int. Cl. H02j 7/00
U.S. Cl. 307—64                10 Claims

ABSTRACT OF THE DISCLOSURE

This invention relates to electrical systems having redundant power supplies and, more particularly, to a control circuit for maintaining an auxiliary power supply on standby while a primary power supply is driving the system, and for switching on the auxiliary power supply when the primary power supply fails. The present invention is useful in industrial control systems, control systems for flight vehicles and many other applications where continuous operation is necessary.

FIELD OF THE INVENTION

In order to insure continuous operation of an electrical system, auxiliary power supplies are provided for driving the system when the primary power supply fails. The auxiliary power supplies are maintained on standby at full voltage and when the primary power supply fails, an auxiliary power supply is switched on, thereby providing continuous operation. This technique, which is known as redundancy, is widely used in control systems for flight vehicles where uninterrupted operation is a primary consideration.

DESCRIPTION OF THE PRIOR ART

Heretofore, arrangements of this type have had several disadvantages. For example, the switching has been accomplished with relays having slow response and limited life, and sparking at the relay contacts has caused electrical interference. Also, since the auxiliary power supplies are maintained on standby at full voltage, they have a reduced operational life.

SUMMARY OF THE INVENTION

The present invention uses a novel arrangement of semiconductors having instantaneous response and long life to accomplish the switching without electrical interference. The arrangement is such that the auxiliary power supplies are maintained on standby at less than full voltage so that they have an operational life near the shelf life of the components therein. Also the use of semiconductors permits the switching to be accomplished with reduced weight and size.

One object of this invention is to provide means having a long life and reduced weight and size for maintaining an auxiliary power supply on standby while a primary power supply is driving an electrical system, and for instantaneously switching on the auxiliary power supply when the primary power supply fails to insure uninterrupted operation of the electrical system.

Another object of this invention is to switch on the auxiliary power supply without causing electrical interference.

Another object of this invention is to minimize the reduction in the operational life of the auxiliary power supply while the auxiliary power supply is on standby so that the operational life is near the shelf life of the components in the auxiliary power supply.

This invention contemplates, for an electrical system having a primary power supply and an auxiliary power supply, a control circuit which comprises: first means connected to the primary power supply and affected thereby for providing a controlling output, said controlling output being at one level when the primary power supply is effective for driving the system and at another level when the primary power supply is ineffective for driving the system; second means connected to the first means and responsive to the controlling output for providing one logic output when the controlling output is at the one level and for providing another logic output when the controlling output is at the other level; and the auxiliary power supply being connected to the second means and controlled by the one logic output therefrom so as to be ineffective for driving the system, and controlled by the other logic output so as to be effective for driving the system.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWING

The single drawing is a schematic diagram showing an electrical system including a control circuit constructed according to the invention.

With reference to the drawing, there is provided a suitable source of alternating current 2, such as may be used in electrical control systems, having an output conductor 4 and a grounded output conductor 6. There is provided at the output conductor 4 and alternating current, such as for example a conventional 115 volt 400 cycle output, which is applied through the output conductor 4 to a conductor 12 joining the output conductor 4 at a point 16. The conductor 12 applies the alternating current to an input of a primary power supply designated by the numeral 8.

The primary power supply 8 has an output conductor 9 and a grounded input-output conductor 10 and is energized through the conductors 12 and 4 by the output from the alternating current source 2. The primary power supply 8 is of a conventional type providing at the output conductor 9 in response to the energizing alternating current supplied from source 2 a suitable direct current output which is applied through the output conductor 9 to an input terminal 29A of a load 30 of a conventional type having a grounded input conductor 32 through which energizing direct current may be applied for driving the load 30. By way of example, the load 30 may be a device such as a direct current motor for driving an electrical control system.

The alternating current output at the output conductor 4 of the alternating current source 2 is applied through the output conductor 4 and a conductor 18 joining the output conductor 4 at the point 16 to an auxiliary power supply designated by the numeral 20. The auxiliary power supply 20 has an output conductor 22 and a grounded input-output conductor 24. The auxiliary power supply is of a conventional type arranged to be energized by the output from the alternating current source 2 so as to provide at the output conductor 22 in response to the energizing alternating current supplied from source 2 a direct current output which is applied through the output conductor 22 to an input terminal 29 of the load 30.

The auxiliary power supply 20 is controlled by an output from a control circuit 34 provided at an output conductor 38 thereof and applied to the auxiliary power supply 20 through the output conductor 38. The control circuit 34 is in turn controlled by the output of the primary power supply 8 at the output conductor 9 and applied to the control network 34 through the output conductor 9 and a conductor 36 joining the output conductor 9 at a point 40. When the direct current output at the output conductor 9 of the primary power supply 8 is at a predetermined level for driving the load 30, the control circuit 34 provides at the output conductor 38 thereof an output for controlling the auxiliary power supply 20 so that the output at the output conductor 22 of the auxiliary power supply 20 is a fraction of the predetermined level which, by way of example, may be one-half of the voltage required to drive the load 30.

When a failure occurs in the primary power supply 8, that is, when the output at the output conductor 9 thereof falls below the predetermined level, the control circuit 34 provides at the output conductor 38 thereof an output for controlling the auxiliary power supply 20 so that the output at the output conductor 22 of the auxiliary power supply 20 is at the predetermined level for driving the load 30, thus insuring continuous operation of the electrical system.

With further reference to the drawing, wherein the control circuit 34 is shown in substantial detail, the direct current output from the primary power supply 8 is applied through the output conductor 9, the conductor 36 joining the output conductor 9 at the point 40, a resistor 41 and a conductor 48 to an anode 49 of a diode 50 included in the control circuit 34. The diode 50 has a cathode 51 which is connected to a base 42 of an NPN type transistor 44 through a conductor 53, a resistor 52 and a conductor 54 leading to the base 42. The transistor 44 has a collector 55 and an emitter 56 connected to a grounded conductor 57. The emitter 56 of the transistor 44 is connected to the conductor 48 leading from the resistor 41 through a conductor 58 joining the conductor 48 at a point 60, a resistor 62 and a conductor 64 joining the grounded conductor 57 at a point 68.

A potentiometer 70 includes a resistance element 72 connected at one end to the collector 55 of the transistor 44 through a conductor 76. The conductor 76 leads from the resistance element 72 and joins at a point 78 a conductor 80 leading from the collector 55 of the transistor 44. The opposite end of the resistance element 72 is connected through a conductor 82 to the emitter 56 of the transistor 44. The conductor 82 leads from the resistance element 72 and joins at a point 86 a conductor 87 leading from the point 68 on the conductor 57. The potentiometer 70 further includes an adjustable arm 88 arranged in cooperative relation with the resistance 72 and connected to an anode 90 of a diode 92 through a resistor 94 and a conductor 96. The diode 92 has a cathode 98 which is connected to a gate element 100 of a silicon controlled rectifier 102 having a cathode element 104 and an anode element 106. The cathode element is connected through a conductor 107 to the point 86 on the conductor 87 leading to the grounded conductor 57. The anode element 106 of the silicon controlled rectifier 102 is connected to the output conductor 38 of the control circuit 34 through a conductor 108 leading from the anode 106 and joining the conductor 38 at a point 110.

The control circuit 34 is biased by the output from the source of alternating current 2 applied through a transformer 120 having a primary winding 122 inductively coupled to a secondary winding 124. Primary winding 122 of transistor 120 has one leg connected at a point 125 to the output conductor 4 of the source of alternating current 2 and another leg connected at a point 121 to a conductor 123 joining the grounded output conductor 6 of the alternating current source 2 at a point 127. Secondary winding 124 of transformer 120 has one leg connected to the conductor 123 at the point 121 and the other leg connected to a conductor 126 leading to the input of the control network 34 so as to provide at the input conductor 126 a stepped down alternating current biasing voltage.

The stepped down alternating current biasing voltage at the input conductor 126 is applied to an anode 130 of a diode 131 in the control circuit 34 through a conductor 132 leading to the anode 130 of the diode 131 and joining the conductor 126 at a point 134. The stepped down alternating current biasing voltage is also applied to an anode 136 of a diode 138 through a conductor 140 leading to the anode 136 of the diode 138 and joining the conductor 126 at the point 134. The diode 131 has a cathode 142 connected to the collector element 55 of the NPN transistor 44 through a conductor 144 leading from the cathode 142, a resistor 146 and a conductor 148 joining the conductor 80 leading from the collector element 55 of the NPN transistor 44 at the point 78. The diode 138 has a cathode 150 connected to the anode 106 of the silicon controlled rectifier 102 through a conductor 152 leading from the cathode 150 of the diode 138, a resistor 154 and a conductor 156 joining the conductor 108 leading from the anode 106 of the silicon controlled rectifier 102 at the point 110.

A capacitor 170 has a plate 172 connected to the cathode 142 of the diode 130 through a conductor 174 joining the conductor 144 leading from the cathode 142 of the diode 130 at a point 176. The capacitor 170 has an opposite plate 178 connected to a grounded conductor 180 through a conductor 182 leading from the plate 178 and joining the grounded conductor 180 at a point 184. A capacitor 190 has a plate 192 connected to the cathode 150 of the diode 138 through a conductor 194 leading from the plate 192 and joining the conductor 152 leading from the cathode 150 of the diode 138 at a point 196. The capacitor 190 has an opposite plate 198 connected to the grounded conductor 180 through a conductor 200 joining the grounded conductor 180 at the point 184.

OPERATION

The output from the alternating current source 2, stepped down by the transformer 120, is applied through the diode 131, the capacitor 170 and the resistor 146 to the collector 55 of the transistor 44 for biasing the transistor 44. The diode 131 converts the stepped down alternating current to a pulsating direct current, and the capacitor 170 and the resistor 146 provide a filter for reducing undesirable ripple and pulsations, thereby providing a relatively constant direct current biasing voltage to prevent erratic operation of the transistor 44. Similarly, the stepped down alternating current output is applied through the diode 138, the capacitor 190 and the resistor 154 to the anode 106 of the silicon controlled rectifier 102 for biasing the silicon controlled rectifier 102. The diode 138 converts the stepped down alternating current to a pulsating direct current, and the capacitor 190 and the resistor 154 provide a filter for reducing undesirable ripple and pulsations, thereby providing a relatively constant direct current biasing voltage to prevent erratic operation of the silicon controlled rectifier 102.

The output from the primary power supply 8 is applied to the base 42 of the transistor 44 through a voltage divider including the resistors 41 and 62, the diode 50, which is an isolating diode, and the resistor 52. When the output from the primary power supply 8 is at the predetermined level for driving the load 30, transistor 44, biased at the colector 55 thereof as heretofore noted, is rendered conductive providing a voltage drop across the resistance element 72 of the potentiometer 70. By adjusting the arm 88 of the potentiometer 70, the voltage drop across the resistor 72, which is applied to the gate 100 of the silicon controlled rectifier 102 through the resistor 94 and the rectifying diode 92, is maintained low enough so that the silicon controlled rectifier 102, biased at the cathode 104 thereof as heretofore noted, is in its nonconductive state. The output at the conductor 38 leading from the anode 106 of the silicon controlled rectifier 102 is then at a predetermined logic level and is applied to the auxiliary power supply 20 for controlling the auxiliary power supply 20 so that the output at the output conductor 22 thereof is a fraction of full voltage, which, by way of example, may be one half of the voltage required for operating the load 30.

When the primary power supply 8 fails, that is, when the output at the output conductor 9 thereof falls below the predetermined level for operating the load 30, this output applied to the base 42 of the transistor 44, renders the transistor 44 nonconductive which in turn increases the voltage drop across the resistor 72 to fire the silicon controlled rectifier 102, whereby the silicon controlled rectifier 102 is driven to its conductive state. The output at the conductor 38 leading from the anode 106 of the silicon controlled rectifier 102 is then at another reduced voltage logic level and is applied to the auxiliary power supply 20 for controlling the auxiliary power supply 20 so that the output at the output conductor 22 thereof is at the predetermined level for operating the load 30. The silicon controlled rectifier 102 will remain conductive until the biasing voltage applied to the gate 100 is removed.

In summation, the output from the primary power supply 8 is applied to the transistor 44 which in turn controls the silicon controlled rectifier 102. When the output of the primary power supply 8 is at the predetermined level for driving the load 30, the transistor 44 is in a conductive state rendering silicon controlled rectifier 102 nonconductive so that the output of the silicon controlled rectifier 102 is at a predetermined increased voltage logic level for maintaining the operation of the auxiliary power supply 20 at a fraction of the predetermined voltage level for operating the load 30. When the primary power supply 8 fails, that is, when the output therefrom falls below the predetermined level, transistor 44 is rendered nonconductive and this, in turn, renders silicon controlled rectifier 102 conductive for providing an output at another predetermined decreased voltage logic level for controlling the auxiliary power supply 20 so that the auxiliary power supply 20 operates at the predetermined level for driving the load 30.

The present invention provides novel means for maintaining an auxiliary power supply on standby at less than full voltage as long as the primary power supply to an electrical system is operating properly to drive the system. When the primary power supply 8 fails, the invention switches on the auxiliary power supply 20 to provide continuous operation of the electrical system. The switching is accomplished instantaneously and through the use of semiconductors having long life and high reliability. Moreover, since the auxiliary power supply 20 operates at less than full voltage when not actually driving the electrical system, the operational life of the auxiliary power supply is maintained near the shelf life of the components therein.

Although the invention has been described with reference to a primary power supply 8 and a single auxiliary power supply 20, it is to be noted that it applies equally as well to a system having a plurality of auxiliary power supplies 20 with each succeeding auxiliary power supply 20 being switched on when the preceding auxiliary power supply 20 fails as explained herein, thereby providing a degree of redundancy consistent with the requirements of the electrical system.

Although only one embodiment of the invention has been illustrated and described, various changes in the form and relative arrangements of the parts which will now appear to those skilled in the art may be made without departing from the scope of the invention. Reference is, therefore, to be had to the appended claims for a definition of the limits of the invention.

I claim:

1. For use in a electrical system having a primary power supply and an auxiliary power supply, a control circuit which comprises:

first means connected to the primary power supply and affected by the output therefrom for providing a controlling output, said controlling output being at one predetermined level when the primary power supply output is at a level effective for driving the system and at another predetermined level when the primary power supply output is below said driving level and ineffective for driving the system;

second means connected to the first means and responsive to the controlling output for providing a logic output, said logic output being at one logic level when the controlling output is at the one predetermined level and at another logic level when the controlling output is at the other predetermined level; and the auxiliary power supply being connected to the second means and controlled by the logic output therefrom at the one logic level so that the auxiliary power supply output is maintained at less than full level to be ineffective for driving the system and controlled by the logic output at the other logic level so that the auxiliary power supply output is switched to full level to be effective for driving the system.

2. A control circuit as defined by claim 1, wherein the first means includes:

a current flow control device having electrodes between which current flows and input and output current flow control elements, and the input current flow control element being connected to the primary power supply;

biasing means connected to the output current flow control element of the current flow control device for providing a predetermined current flow between the electrodes thereof so that there is one predetermined voltage drop across said electrodes when the primary power supply is effective for driving the system and another predetermined voltage drop across said electrodes when the primary power supply is ineffective for driving the system; and third means connected to the current flow control device and responsive to the one predetermined voltage drop across the electrodes thereof so as to provide the controlling output at the one predetermined level, and responsive to the other predetermined voltage drop so as to provide the controlling output at the other predetermined level.

3. A control circuit as defined by claim 1, wherein the second means includes:

a current flow control device having electrodes between which current flows and input and output current flow control elements, and the input current flow control element being connected to the first means; and biasing means connected to the output current flow control element of the current flow control device for providing a predetermined current flow between the electrodes thereof so that there is provided at the output current flow control element the logic output at the one logic level when the controlling output provided by the first means is at the one predetermined level, the logic output being at the other logic level when the controlling output is at the other predetermined level.

4. A control circuit as defined by claim 2, wherein:

the current flow control device includes a transistor having a base element, a collector element and an emitter element, with the base element of the transistor being connected to the primary power supply;

the biasing means includes means for providing a constant direct current biasing voltage connected to the collector element of the transistor; and the one predetermined voltage drop and the other predetermined voltage drop appearing across the collector and emitter elements of the transistor.

5. A control circuit as defined by claim 3, wherein:
the current flow control device includes a silicon controlled rectifier having a gate element, an anode element and a cathode element, with the gate element being connected to the first means;
the biasing means includes means for providing a constant direct current biasing voltage connected to the anode element; and
the logic output at the one logic level and at the other logic level appearing at the anode element of the silicon controlled rectifier.

6. A control circuit as defined by claim 5, wherein:
the auxiliary power supply is connected to the anode element of the silicon controlled rectifier and responsive to the logic output thereat for providing a driving output, said driving output being at a first level when the logic output is at the one logic level and at a second level when the logic output is at the other logic level; and
load means connected to the auxiliary power supply and driven thereby when the driving output from the auxiliary power supply is at the second level.

7. A control circuit as defined by claim 1, wherein:
the primary power supply provides a driving output, said driving output being at a first level when the power supply is effective for driving the system and at a second level when the power supply is ineffective for driving the system, said second level being lower than the first level; and
load means connected to the primary power supply and driven thereby upon the driving output from the auxiliary power supply being at the first level.

8. A control circuit as defined by claim 1, including means for coupling the first means to the primary power supply, said coupling means comprising:

a voltage divider connected to the primary power supply; and
a unidirectional current flow control device connected to the voltage divider and connected to the first means so as to provide a predetermined current flow to the first means.

9. A control circuit as defined by claim 2, wherein the third means connected to the current flow control device includes:
a potentiometer connected across the electrodes of the current flow control device and operable for selecting a portion of the one predetermined voltage drop and of the other predetermined voltage drop for providing the controlling output at the one predetermined level and at the other predetermined level, respectively.

10. A control circuit as defined by claim 1, including means for coupling the first means to the second means, said coupling means comprising:
a unidirectional current flow control device connected to the first means and to the second means so as to provide a predetermined current flow to the second means in response to the controlling output from the first means.

References Cited

UNITED STATES PATENTS

| | | | |
|---|---|---|---|
| 3,249,769 | 5/1966 | Mierendorf | 307—64 X |
| 3,300,651 | 1/1967 | Larson | 307—64 X |

ROBERT S. MACON, Primary Examiner

H. J. HOHAUSER, Assistant Examiner